though not illustrated in detail, is understood to be fashioned in the manner in which impact drilling tools are conventionally fashioned, namely, to include a tool portion proper which carries the bit 60 and a shank which is slidably but non-rotatably arranged in a sleeve, the sleeve being rotated by being connected to the drive means of the machine tool. Such an arrangement permits the tool 9 to be rotated by the sleeve while at the same time allowing the tool 9 to carry out its axial vibratory movement relative to the sleeve. The present invention is concerned with the drive connection between such a sleeve and the motor 1.

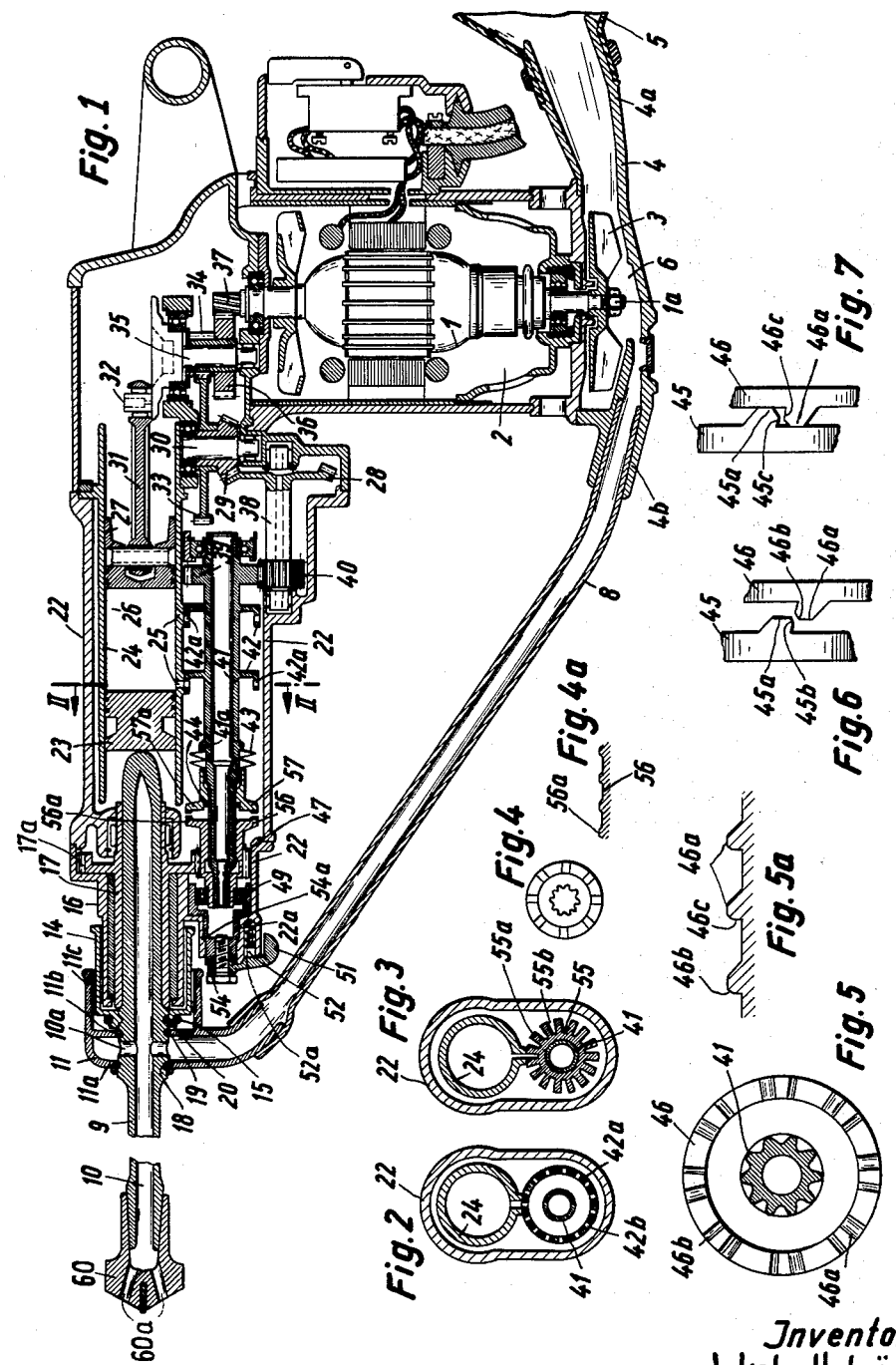

United States Patent Office 3,256,944
Patented June 21, 1966

1

3,256,944
MACHINE TOOL
Jakob Holzäpfel, Neubulach, Kreis Calw, Wurttemberg, Germany, assignor to Firma Friedrich Duss, Maschinenfabrik, Neubulach, Kreis Calw, Wurttemberg, Germany
Filed Sept. 30, 1963, Ser. No. 312,375
Claims priority, application Germany, Oct. 4, 1962, H 47,069; Mar. 4, 1963, H 48,423
18 Claims. (Cl. 173—75)

The present invention relates to a machine tool.

More particularly, the present invention relates to manually guided, electrically driven power drills for working stone, which incorporates a rotary axially vibratable drilling tool whose vibratory movement is brought about by the stroke of a piston which is arranged in a cylinder and which is driven by means of a crank drive. The piston acts on the drilling tool via an air cushion that is periodically placed in communication with atmosphere and a mass which is arranged in the cylinder and is reciprocated therein by this air cushion.

Power drills of the above type have been found to be susceptible to trouble, i.e., breakdown. Furthermore, the usefulness of such power drills is limited due to the lack of any commercially practical means for removing the stone powder or dust particles which are produced during the drilling operation, and such powder removing means as were provided were found to impede the freedom of movement of the power drill which, in the case of manually guided work tools of this type, cannot be tolerated.

It is, therefore, an object of the present invention to provide power drills of the above type which overcome the above drawbacks.

More particularly, it is the primary object of the present invention to provide a power drill which is so arranged that powder produced during the drilling operation is removed, and that the manner in which the powder is removed does not interfere with the free maneuverability of the drill.

With the above objects in view the present invention resides, basically, in a motor-driven power drill of the above described type which incorporates suction means for removing the powder, the suction means incorporating a blower which is driven by the motor and forms a single structural entity therewith. In this way, there is obtained a relatively simple and inexpensive power drill, complete with suction means for removing the stone powder created as a result of the drilling operation.

Additional objects and advantages of the present invention will become apparent upon consideration of the following description when taken in conjunction with the accompanying drawings in which:

FIGURE 1 is a longitudinal sectional view of a power drill according to the present invention.

FIGURE 2 is a sectional view taken on line II—II of FIGURE 1.

FIGURE 3 is a sectional view similar to that of FIGURE 2 but showing a modified embodiment of a part incorporated in a power drill according to the present invention.

FIGURE 4 is a front view of a coupling sleeve forming part of the clutch mechanism by means of which the drilling tool proper is power-transmittingly connected to the motor of the power drill.

FIGURE 4a is a development of the sleeve of FIGURE 4.

FIGURE 5 is a front view, on an enlarged scale, of a coupling sleeve similar to that of FIGURES 4 and 4a but showing a modification of the sleeve.

FIGURE 5a is a development of the sleeve of FIGURE 5.

FIGURE 6 shows the relative position which the coupling sleeves of FIGURES 5 and 5a occupy with respect to each other when the clutch is to operate as an overload or slipping clutch.

FIGURE 7 shows the relative position which the same coupling sleeves occupy with respect to each other when the clutch is to establish a positive, non-slipping connection at all times, irrespective of the load on the drill.

Referring now to the drawings, the same shows a power drill according to the present invention which incorporates, as a main drive, a univeral-type motor 1, i.e., a motor which is operable on alternating or direct current. The upper end of the motor shaft, as viewed in FIGURE 1, carries a pinion 37 which is in mesh with a gear 36 carried by a shaft 35. The upper end of the shaft 35 carries a crank pin 32 to which one end of a piston rod 31 is pivotally connected. The other end of the piston rod 31 is pivotally connected to a piston 27 which is slidably arranged in a stationary cylinder 24. Also slidably arranged in cylinder 24 is a piston-like mass 23 so that an air cushion, indicated at 26, is formed between the face of the piston 24 and the mass 23, the mass contacts the rear end of the actual drilling tool 9, which carries a bit 60. The cylinder 24 is provided with openings such as bores 25 by which the interior of that portion of the cylinder 24 in which the air cushion 26 is located may be vented, i.e., be placed in communication with the surrounding atmosphere.

The power drill further comprises a valve device in the form of a control shaft 41 which, as will be described below, coacts with the openings 25 so that when the shaft 41 is in the position illustrated in FIGURE 1, the air cushion 26 is vented. In the illustrated embodiment, the bores 25 place the air cushion in communication with the space that is actually enclosed by the machine housing 22, but since the interior of the housing 22 is, in practice, not air-tight, the bores 25 can reasonably be considered as actually venting the air cushion to atmosphere.

The shaft 41 is, as illustrated, arranged in housing 22 and is oriented paralllel to the cylinder 24. The shaft is hollow and is driven by the motor 1 via of a gear train which includes a pinion 34 carried by the shaft 35, which pinion is in mesh with a gear 33 carried by an idler shaft 30. The idler shaft 30 also carries a bevel pinion 29 which, in turn, is in mesh with a spur bevel gear 28 which itself is mounted on a further idler shaft 38. The latter carries a pinion 40 which meshes with a gear ring 39 carried by the hollow shaft 41.

The shaft 41 carries two tubular rollers 42 which are axially so positioned on the shaft 41 as to be aligned with the external ends of the bores 25 that place the air cushion 26 in communication with atmosphere and which slide along these external ends of the bores. The walls 42a of the rollers 42 are provided with openings 42b arranged about the circumference of the respective walls. The distance between consecutive openings 42b is sufficiently large so that, during rotation of the shaft 41, the bores 25 will periodically be completely covered. In practice, the transmission ratio of the above-described gear train between the crank shaft 35 and the shaft 41 is such that the bores 25 will be periodically covered in synchronism with the stroke of the piston 27.

FIGURE 3 shows a modification of the valve shaft which is here fashioned as a massive shaft whose circumferential wall 55a is provided with evenly spaced cutouts 55b arranged about a circle. During rotation of the shaft 55, the bores 25 will, as in the above-described embodiment, be periodically covered by the outer surface portions of the shaft wall 55a, this covering occurring, as described above, in synchronism with the stroke of the piston 27.

The rotation of the shaft 41 is also utilized to bring about the rotation of the drilling tool 9. The tool 9 is held by a tool holder 17 which is rotated by the shaft 41 via a clutch, e.g., slipping clutch-type coupling. This coupling comprises two coupling sleeves 56 and 57 which are mounted on the shaft 41 so as to be axially slidable with respect thereto, sleeve 57 being keyed or splined to the shaft 41 and the sleeve 56 being provided with a gear ring 47 in mesh with a gear ring 17a of tool holder 17. As is best shown in FIGURES 4 and 4a, the lateral edges of the coupling lugs 56a, 57a, of the sleeves 56, 57, respectively, are inclined at an angle of approximately 35°. The rear end of sleeve 57 (right-hand end as viewed in FIGURE 1) engages a spring device 43, made up, for example, of a stack of dished springs, which spring device is interposed between the sleeve 57 and an annular abutment 41a on the shaft 41. The leftward movement of the sleeve 57 under the influence of the spring device 43 is limited by a stop ring 44 which is carried by shaft 41.

The extent to which the sleeve 56 is pressed against the sleeve 57 can be adjusted by means of an adjusting device, which even allows the two sleeves to remain out of engagement. The adjusting device comprises an adjusting nut 54 having an external thread 54a which engages the internal thread 22a formed on housing 22, there being a handle 51 by means of which the nut 54 can be rotated. The rotation of the nut 54 brings with it an axial displacement of the nut with respect to the housing 22. This axial displacement is transmitted to the sleeve 56 via a grooved ball bearing 49 whose outer race is firmly connected to the adjusting nut 54. The adjusting device further comprises an axially displaceable detent pin 52, acted on by a spring 52a, which pin 52 projects into an arcuate opening of housing 22 within which there are suitable recesses adapted to receive the pin 52. In this way, the setting of the adjusting device may be varied in a stepwise manner and the adjusting device may be locked into the respective adjusted positions.

It will be seen from the above that if the sleeve 56 is moved rightwardly by the adjusting device to a portion in which the sleeve 56 engages the sleeve 57, the maximum force which can be transmitted from motor 1 to the bit 60 depends on the pressure with which the coupling sleeves 56 and 57 are pressed against each other; consequently, if the bit 60 is blocked, the sleeve 57 will yield against the pressure of the spring device 43 so that no further rotation is transmitted to the sleeve 56. In this way, there is no danger that the tool will be wrenched from the hand of the operator in case the bit becomes, in some fashion or other, blocked.

In the embodiment of FIGURES 5 to 7, the coupling lugs 45a, 46a, of coupling sleeves 45, 46, are provided with differently inclined clutch surfaces 45b, 45c, and 46b, 46c, respectively. Each of the coupling lugs 45a of the driving sleeve 45 is provided with a coupling surface 45c which is inclined, with respect to the end face of the lug, in the direction of rotation and a coupling surface 45b which is inclined against the direction of rotation. The lugs 46a of the driven sleeve 46 are provided with coupling surfaces 46b and 46c which are directed against the surfaces 45b, 45c, of the driving sleeve 45, as shown in FIGURES 6 and 7.

The clutch is thus capable of assuming any one of three operating positions:

If the sleeve 45 is moved out of engagement with the sleeve 46, no rotation can be transmitted to the drill; this is the position which the sleeves 56, 57 are illustrated as occupying in FIGURE 1.

In the position of the parts illustrated in FIGURE 6, the coupling sleeves coact to form a safety or slipping clutch, it being the inclined surfaces 45a, 46a, which engage each other. The point at which the clutch slips depends on the greater or lesser bias provided by the spring device 43 (FIGURE 1).

In the position of the parts illustrated in FIGURE 7, the sleeves 45 and 46 are in positive engagement with each other so that the surfaces 45c and 46c of the coupling lugs are in contact. In this position, the sleeves 45 and 46 are coupled together positively so that there can be no slippage between the two coupling sleeves.

Referring now once again to FIGURE 1, the drilling tool used in a machine according to the present invention is provided with a longitudinal channel 10 which is in communication with flaring channels 60a of the bit 60. The channel 10 is also in communication with two radial bores 10a. Also provided is an elastic suction ring 11 which has a U-shaped cross section and encompasses the drill 9 and is in axial alignment with the bores 10a. A suction conduit line 8 is connected to the suction ring 11 and is thus in communication with the channel 10 via the bores 10a. The suction ring 11 has annular discs 11a and 11b which are slidably received in peripheral grooves 18, 19, of the tool 9. The cross-sectional configurations of the edge portions of the discs mate with the cross-sectional configurations of the grooves.

The suction ring 11 is further provided with a tubular extension 11c which surrounds a sleeve 14 that is seated on the tool 9 and rotates therewith, there being some play or clearance between the extension 11c and the sleeve 14. The sleeve 14 itself surrounds a stationary hub 16 within which the tool holder 17 is rotatably mounted. The sleeve 14 is anchored in a peripheral groove 20 of the tool 9 and is pressed tightly into the groove by means of a spring ring 15.

The suction ring 11 and the sleeve 14 together form a double shield which protects the drive mechanism of the power drill against the entry of dust or powder produced as the result of the drilling operation, which shielding has been found to remain effective, over long periods of time, even under the most strenuous conditions. Should, for example, due to wear and/or aging, the discs 11a and 11b of the suction ring 11 work their way out of their respective grooves so that dust seeps out of the ring 11, the relative movement between the sleeve 14, which rotates with the tool 9, and the tubular extension 11c of ring 11, which is stationary, will move any dust out of the region of the driving elements. A forced powder removal can be effected if the opposing surfaces of extension 11c and sleeve 14, i.e., the inner surface of the extension 11c and the outer surface of the sleeve 14, are so profiled as to constitute a screw-type feed conveyer whose direction of feed extends outwardly, i.e., rightwardly as viewed in FIGURE 1.

The other end of the suction line is connected to the suction inlet 4b of a blower housing 4 which forms a blower chamber 6 within which there is arranged a centrifugal blower 3 carried by the lower end 1a of the shaft of motor 1. The vanes of the blower 3 are so oriented that a suction is exerted on the line 8. The output or discharge side of the blower chamber opens into a radial discharge outlet 4a to which a suitable dust-receiving receptacle, such as a sack 5, is connected.

For certain operating conditions, it is expedient to replace the sack 5 by a hose through which the dust sucked in by the blower 3 is piped to a receptacle located away from the site at which the drilling is being carried on.

The blower 3 can be used to carry off the heat generated by the motor 1. In that case, a suitable communication is provided between the suction inlet of the blower chamber 6 and the chamber 2 within which the motor 1 is arranged.

It will be understood that the above description of the present invention is susceptible to various modifications, changes, and adaptations, and the same are intended to be comprehended within the meaning and range of equivalents of the appended claims.

What is claimed is:

1. A manually guided, electrically driven power drill for working stone, said power drill comprising, in combination: a rotary, axially vibratable drilling tool, said tool being provided with internal channel means; means for vibrating said tool in axial direction and including a cylinder, a piston-like mass slidably arranged in said cylinder and engaging said tool, a piston also slidably arranged in said cylinder and being axially spaced from said mass thereby to form an air cushion between said mass and said piston, a crank drive for reciprocating said piston in said cylinder, a drive motor for driving said crank drive, and means driven by said motor for periodically placing that portion of said cylinder in which said air cushion is located in communication with atmosphere; blower means driven by said motor and forming a single structural entity therewith, said blower means having a suction inlet; and conduit means placing said channel means of said tool in communication with said suction inlet of said blower means.

2. A power drill as defined in claim 1 wherein said motor has a shaft and wherein said blower means comprise a centrifugal blower mounted on said motor shaft.

3. A power drill as defined in claim 2 wherein said power drill further comprises a casing, a portion of said casing forming a blower housing within which said blower is arranged, said blower housing having a discharge outlet; and receiving means in communication with said discharge outlet.

4. A power drill as defined in claim 3 wherein said receiving means comprise a receptacle attached to said discharge outlet.

5. A power drill as defined in claim 3 wherein said receiving means comprise a receptacle located away from the site at which the drilling is carried on, and a hose placing said discharge outlet and said receptacle in communication with each other.

6. A power drill as defined in claim 3 wherein a further portion of said casing forms a motor housing within which said motor is arranged, there being means for placing said motor housing in communication with said suction inlet of said blower housing.

7. A power drill as defined in claim 1 wherein said conduit means comprise an elastic suction ring of U-shaped cross section surrounding said drilling tool and being in communication with said channel means thereof.

8. A power drill as defined in claim 7 wherein said suction ring has edge portions which are slidably received by said drilling tool.

9. A power drill as defined in claim 8 wherein the cross-sectional configuration of said edge portions of said suction ring mate with the cross-sectional configuration of grooves of said drilling tool within which said edge portions are slidably received.

10. A power drill as defined in claim 8 wherein said tool is rotatably mounted within a stationary hub, said tool carrying, for rotation therewith, a sleeve which surrounds said stationary hub; said suction ring being provided with a tubular extension which encompasses said rotary sleeve with clearance.

11. A power drill as defined in claim 10, further comprising conveyor screw means interposed between the inner surface of said tubular extension and the outer surface of said rotary sleeve.

12. A power drill as defined in claim 1 wherein said vibrating means comprise at least one bore through said portion of said cylinder in which said air cushion is located, and valve means coacting with said bore and incorporating a shaft mounted for rotation about an axis parallel to said cylinder, said shaft having a peripheral surface sliding along the external end of said bore and being provided with circumferentially spaced apart openings through which said bore, and hence the interior of said cylinder, is vented, whereby upon rotation of said valve shaft, said air cushion is periodically vented.

13. A power drill as defined in claim 12 wherein said vibrating means further comprise a transmission for power-transmittingly connecting said valve shaft with said motor to cause said motor to rotate said valve shaft in synchronism with the stroke of said piston.

14. A power drill as defined in claim 13, further comprising motion-transmitting means for applying the rotation of said valve shaft to said drilling tool.

15. A power drill as defined in claim 14 wherein said motion-transmitting means comprise a slipping clutch.

16. A power drill as defined in claim 15 wherein said slipping clutch comprises a first coupling sleeve non-rotatably mounted on said shaft, a second coupling sleeve also mounted on said shaft, said sleeves being axially displaceable on said shaft, an adjusting device for adjusting the axial position of one of said sleeves with respect to the other; and a spring device for biassing the other of said sleeves into engagement with said one sleeve.

17. A power drill as defined in claim 16 wherein said coupling sleeves are provided with coupling lugs each having two surfaces cooperating with respective surfaces of a lug of the other sleeve, one set of surfaces being inclined in the direction of rotation to provide a slipping engagement of said sleeves and the other set surfaces being inclined to against the direction of rotation to provide a positive non-slipping engagement of said sleeves.

18. A manually guided, electrically driven power drill for working stone, said power drill comprising, in combination: a rotary axially vibratable drilling tool, said tool being provided with internal channel means; means operatively connected with said drill for axially vibrating the same, said means including a driving motor; blower means also driven by said motor and forming a single structural entity therewith, said blower means having a suction inlet; and conduit means placing said channel means of said tool in communication with said suction inlet of said blower means.

References Cited by the Examiner

UNITED STATES PATENTS

| 1,023,594 | 4/1912 | Prellwitz | 173—35 |
| 2,375,689 | 5/1945 | Reeder | 173—35 |
| 3,154,154 | 10/1964 | Wicklund | 173—80 |
| 3,161,242 | 12/1964 | Etzkorn et al. | 173—109 |
| 3,170,523 | 2/1965 | Short | 173—104 |

BROUGHTON G. DURHAM, *Primary Examiner.*

L. P. KESSLER, *Assistant Examiner.*